United States Patent
Zhang et al.

(10) Patent No.: US 10,289,765 B2
(45) Date of Patent: May 14, 2019

(54) FAST MODEL GENERATING AND SOLVING METHOD FOR SECURITY-CONSTRAINED POWER SYSTEM OPERATION SIMULATION

(71) Applicant: Tsinghua University, Beijing (CN)

(72) Inventors: Ning Zhang, Beijing (CN); Chongqing Kang, Beijing (CN); Qing Xia, Beijing (CN); Ershun Du, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 337 days.

(21) Appl. No.: 15/248,019

(22) Filed: Aug. 26, 2016

(65) Prior Publication Data

US 2017/0083648 A1 Mar. 23, 2017

(30) Foreign Application Priority Data

Sep. 23, 2015 (CN) .......................... 2015 1 0611268

(51) Int. Cl.
G06F 17/16 (2006.01)
G06F 17/50 (2006.01)
G06F 17/11 (2006.01)

(52) U.S. Cl.
CPC .......... G06F 17/5009 (2013.01); G06F 17/11 (2013.01); G06F 17/16 (2013.01)

(58) Field of Classification Search
CPC ...... G06F 17/5009; G06F 17/11; G06F 17/16; H02J 2003/003; H02J 2003/007; H02J 3/28; H02J 3/386

See application file for complete search history.

(56) References Cited

U.S. PATENT DOCUMENTS

2011/0035071 A1* 2/2011 Sun .......................... H02J 3/00
  700/291
2011/0282508 A1* 11/2011 Goutard ................... H02J 3/06
  700/293

(Continued)

OTHER PUBLICATIONS

Wang et al., "Security-Constrained Unit Commitment With Volatile Wind Power Generation" (Aug. 2008), IEEE Transactions on Power Systems, vol. 23, Issue 3, pp. 1319-1327 [retrieved from https://ieeexplore.ieee.org/abstract/document/4556639].*

(Continued)

Primary Examiner — Brian W Wathen
(74) Attorney, Agent, or Firm — Hodgson Russ LLP

(57) ABSTRACT

The present disclosure provides a fast model generating and solving method for security-constrained power system operation simulation, which includes: obtaining information of all branches and nodes which are involved during operation simulation time period, calculating original-node impedance matrix, load shifting distribution factor original matrix and generator shifting distribution factor original matrix of all involved branches; correcting the load shifting distribution factor original matrix and the generator shifting distribution factor original matrix according to the on-off state of branches; obtaining output of each generator unit at each time period according to no-security-constraint unit commitment model, and determining overload of each branch again; solving iteratively until no branch is overloaded, and obtaining output of each generator unit at each time period under security constraint of operation simulation for the current simulation day, performing operating simulation for the rest simulation days to obtain security-constraint operation simulation result for the whole year.

9 Claims, 1 Drawing Sheet

(56) References Cited

U.S. PATENT DOCUMENTS

2016/0099567 A1* 4/2016 Sun .......................... H02J 3/14
700/296
2016/0273518 A1* 9/2016 Chen ....................... F03D 7/048

OTHER PUBLICATIONS

Fripp, "Switch: A Planning Tool for Power Systems with Large Shares of Intermittent Renewable Energy," Environmental Science & Technology, American Chemical Society, 2012, vol. 46, pp. 6371-6378.

Weber et al., "WILMAR: A Stochastic Programming Tool to Analyze the Large-Scale Integration of Wind Energy," Optimization in the Energy Industry, Jan. 2009, pp. 437-458.

* cited by examiner

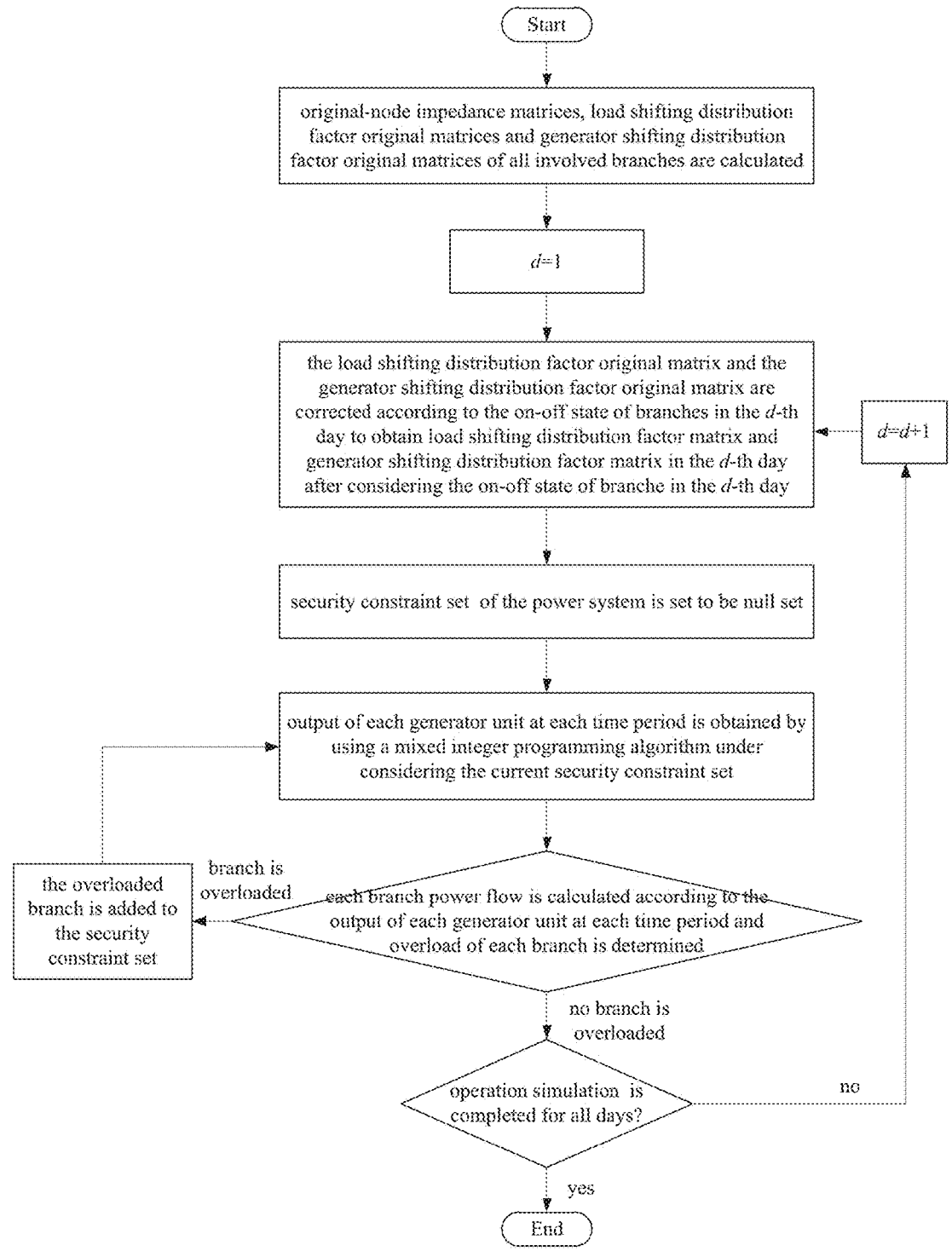

FAST MODEL GENERATING AND SOLVING METHOD FOR SECURITY-CONSTRAINED POWER SYSTEM OPERATION SIMULATION

CROSS-REFERENCE TO RELATED APPLICATION

This application claims priority to and benefits of Chinese Patent Application Serial No. 201510611268.3, filed with the State Intellectual Property Office of P. R. China on Sep. 24, 2015, the entire contents of which are incorporated herein by reference.

FIELD

The present disclosure relates to power-system analyzing field, and more particular, to a fast model generating and solving method for security-constrained power system operation simulation.

BACKGROUND

In recent years, with the increasing scale of power system, the operation complexity of power grid has been greatly increased as a result of many factors including the addition of intermittent energy resources, such as wind energy and solar energy, the construction of large-scale multi-level inter-basin hydropower plants, the integration of various-type powers, such as nuclear power, pumped storage power, and gas-turbine power, and the structure of power grid with AC-DC hybrid transmission over long distance. In the conventional power-system planning, in order to evaluate the adaptability and economy of future electricity planning, operating position of every generator unit on the load curve is arranged through production simulation technology. However, with the increasing variety of power supply structure and complexity of power grid structure, the power system operation is involved with many various constraints, such as peak load regulation, generator on-off constraints and securities of branch and interface power flow. The conventional production simulation technology is often difficult to consider all these operational constraints during practical operations. Therefore, a new technology called power system operation simulation appears. That is, for a given power planning scheme, the unit commitment model is used to consider all the operational constraints in the long-time operations of power system. This can refine the evaluation indexes for the current power planning program from many aspects, such as adaptability, economy and environmental protection in the future operation.

Currently, power system operation simulation technology without consideration of system security constraints is relatively mature, and some software products have appeared in abroad. Riso laboratory in Denmark has developed an operation simulation software for the power system, named Wilmar (WEBER Christoph, MEIBOM Peter. BARTH Rudiger, et al. WILMAR: A Stochastic Programming Tool to Analyze the Large-Scale Integration of Wind Energy. In: KALLRATH Josef. PARDALOS Panos M. REBENNACK Steffen, et al., Optimization in the Energy Industry, Energy Systems: Springer Berlin Heidelberg, 2009. p 437-458). This software evaluates system operation cost by hourly simulating the operation and is applied in the wind power integration planning and pumped storage planning. However, this software can only consider simulation of power source and does not model the power grid. Therefore, it cannot consider operation security constraints, such as securities of branch and interface power flow of the power system. GE Company has developed a software named MAPS which is able to achieve the chronological operation simulation of multi-area connected power systems considering the power delivery security constraints between different areas (http://www.geenergyconsulting.com/practice-area/software-products/maps). Oxford University has developed a software named Switch which can achieve similar functions (FRIPP Matthias. Switch: A Planning Tool for Power Systems with Large Shares of Intermittent Renewable Energy. Environmental Science & Technology, 2014, 46(11): 6371-6378.). Although branch power flow limits in the multi-area power system are considered in MAPS and Switch, MAPS and Switch can only divide the power system into several areas or tens of areas. Establishing network-flow model for power delivery between different areas cannot describe the detailed power flow of the power-grid. The simulation results can only analyze the rationality and economy of power supply structure and configuration in each area, and cannot analyze the security, rationality and economy of the power grid planning.

Considering system security constraints in the power system operation simulation brings great challenge to calculation and modeling. It is because that when the scale of the power grid is larger, node and branch of the power system that needs to be considered in the security-constraint power system are increasing. For example, generally, the power system for a middle-scale provincial network includes 100~200 power generator units, and 1000~2000 nodes, and 2000~5000 branches. The amount of decision variables for daily unit commitment model in the operation simulation without considering security constraints will be more than ten thousand, and the number of constraints will be more than twenty thousand. When security constraints are included, the number of constraints will further increase to more than one-hundred thousand. It will cost great calculation and storage resources for such large-scale optimization model. Therefore, the calculation and storage resources become the bottleneck for practical use of the security-constrained power system operation simulation in the large-scale power system.

Therefore, it is needed to propose technologies to rapidly generate and calculate the security-constrained unit commitment model, based on current power system operation simulation technology, in order to increase calculating efficiency of the security-constrained power system operation simulation, which makes the security-constrained power system operation simulation able to apply to large-scale real-world power system. The related art of the present disclosure include:

1) Security-constraint power system operation simulation means that, certain scheduling objectives are selected according to power grid planning and power installed capacity planning with system load prediction and boundary conditions of power system operation formed by primary energy; and power system planning or power system operation mode is evaluated according to operation simulation result after a period of operation of the simulation system under generator unit operation constraints, system branch and interface power flow. Core of the power system operation simulation is to solve the unit commitment model daily or week-by-week and is expressed as mixed integer programming model, as following:

$$\min f(X,I)$$

$$s.t.\ CP^T + DI^T \le b$$

$\underline{F} \leq G_G P^T - G_D L^T \leq \overline{F}$ $\underline{P}^T \leq P^T \leq \overline{P}^T$ In the above expressions, P and I are decision variables of the above optimal model. P is vector of output of different types of generator unit at each time period, and its elements are continuous variables. I is vector of state variables of generator units, and it elements are 0-or-1 variables. T is superscript denoting transposition of vector or matrix. The objective f(P,I) is the minimization of the total system operating cost, which includes the fuel, on-off, and load shedding costs. The constraint $CP^T + DI^T \leq b$ is the system operating constraint and generator unit operating constraint. The system operating constraint includes load-generation balance constraint and back-up balance constraint. The generator unit operating constraint includes generator unit output constraint, rate of change of output constraint, generator unit on-off constraint, and electric quantity constraint, etc. C is coefficient matrix in front of the decision variable P corresponding to generator unit output in the above constraints. D is coefficient matrix in front of the decision variable I corresponding to generator unit state in the above constraints, and b is right constant term vector in each above constraint. The constraint $\underline{F} \leq G_G P^T + G_D L^T \leq \overline{F}$ is security constraints of branch and transformer power flow. $G_G$ is generator shifting distribution factor. L is vector of node loads. $\underline{F}$ and $\overline{F}$ are the upper and lower limits of branch power flow, respectively. The constraint $\underline{P}^T \leq P^T \leq \overline{P}^T$ is the upper and lower limit constraints of P. T is transposition symbol. The detailed model of the power system operation simulation can be referred to the paper (Ning Zhang, Chongqing Kang, Daniel S. Kirschen, Qing Xia, Weimin Xi, Junhui Huang, Qian Zhang: Planning pumped storage capacity for wind power integration. IEEE Transactions on Sustainable Energy, 2013, 4(2): 393-401).

2) Generator shifting distribution factor matrix and load shifting distribution factor matrix:

The generator shifting distribution factor matrix means sensitivity of the generator output to the branch power flow. The load shifting distribution factor matrix means sensitivity of the node load to the branch power flow. If there are K branches, N nodes and M generator units in the power system, the generator shifting distribution factor $G_G$ and the load shifting distribution factor $G_D$ can be expressed as following:

$$G_G = \begin{bmatrix} g_{11} & g_{12} & \cdots & g_{1M} \\ g_{21} & g_{22} & \cdots & g_{2M} \\ \vdots & \vdots & \ddots & \vdots \\ g_{K1} & g_{K2} & \cdots & g_{KM} \end{bmatrix}, G_D = \begin{bmatrix} g_{11} & g_{12} & \cdots & g_{1N} \\ g_{21} & g_{22} & \cdots & g_{2N} \\ \vdots & \vdots & \ddots & \vdots \\ g_{K1} & g_{K2} & \cdots & g_{KN} \end{bmatrix}.$$

There are K rows and M columns in matrix $G_G$. $g_{lm}$ is sensitivity of generator unit m to branch l. There are K rows and N columns in matrix $G_D$. $g_{ln}$ is sensitivity of node n to branch l. If output vector X of all generator units and load L of all nodes are known, then branch power flow can be obtained by the matrix $G_G$ and $G_D$, as following:

$F = G_G P^T - G_D L^T.$

In the above expression, F is vector of branch power flow.

3) Mixed integer programming optimal solving algorithm: this algorithm can give optimal solution of the model using computer to solve the mixed integer programming optimal problem.

SUMMARY

Embodiments of the present disclosure provides a fast model generating and solving method for security-constrained power system operation simulation, to solve a problem of low calculating efficiency caused by a larger-scale optimal model in the security-constrained power system operation simulation. Firstly, the method generates a load shifting distribution factor matrix and a generator shifting distribution factor matrix corresponding to full power system topology, and then corrects the load shifting distribution factor matrix and the generator shifting distribution factor matrix according to on-off state of branches in each day. The method can avoid recalculation for each day to improve modeling efficiency of the unit commitment model. Meanwhile, when solving the unit commitment model, the method uses useful security-constraints recognition technology to only introduce the useful security constraints to the unit commitment model. This improves solving efficiency of the unit commitment model.

In our implementation, the fast model generating and solving method for security-constrained power system operation simulation includes following steps: 1) obtaining information of all branches and nodes which are involved during operation simulation time period, calculating original-node impedance matrix, load shifting distribution factor original matrix and generator shifting distribution factor original matrix of all involved branches according to connections between the branches and the nodes and reactance of each branch;

2) starting operation simulation calculation day-by-day to obtain on-off state of branches in a current simulation day, correcting the load shifting distribution factor original matrix and the generator shifting distribution factor original matrix according to the on-off state of branches to obtain load shifting distribution factor matrix and generator shifting distribution factor matrix in the current simulation day after considering the on-off state of branches;

3) obtaining output of each generator unit at each time period using a mixed integer programming algorithm according to no-security-constraint unit commitment model, for each time period, calculating each branch power flow according to the output of each generator unit at each time period and node loads, determining overload of each branch according to the branch power flow and branch power flow limits; generating security constraint in the unit commitment model according to rows of the load shifting distribution factor matrix and the generator shifting distribution factor matrix corresponding for the overloaded branches, obtaining the output of each generator unit at each time period using the mixed integer programming algorithm according to the no-security-constraint unit commitment model again, and then, determining overload of each branch again; solving iteratively until no branch is overloaded, and obtaining output of each generator unit at each time period under security constraint for completion of operation simulation for the current simulation day, performing operating simulation for the rest simulation days to obtain security-constraint operation simulation result for the whole year.

Advantages of the fast model generating and solving method for security-constrained power system operation simulation in the embodiments of the present disclosure follows:

The fast model generating and solving method for security-constrained power system operation simulation is based on the conventional power system operation simulation. The method can calculate the load shifting distribution factor matrix and the generator shifting distribution factor matrix fast in each simulation day and solve the security-constrained unit commitment model fast. Calculations of the security-constrained power system operation simulation can be applied to the large-scale real-world power system by implementing the method in the embodiments of the present disclosure. Indexes, such as adaptability, economy, environmental protection, etc. can be evaluated more accurately in the future implementation of the power system planning. This improves fineness of the power system planning. Therefore, the method in the embodiments of the present disclosure is a promising technique for practical power systems.

BRIEF DESCRIPTION OF THE DRAWINGS

These and other aspects and advantages of embodiments of the present disclosure will become apparent and more readily appreciated from the following descriptions made with reference to the accompanying drawing, in which:

The FIGURE is a flow chart of a fast model generating and solving method for security-constrained power system operation simulation, according to an embodiment of the present disclosure.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

Following are detailed descriptions for a fast model generating and solving method for security-constrained power system operation simulation.

In the fast model generating and solving method, a branch is defined by including transmission lines, cables, transformers and power transmission equipments connected to two buses, and the node is defined by one bus in the security-constrained power system. Number of the branch is K, number of the node is N and number of generator unit is M in the security-constrained power system.

The flow chart of the fast model generating and solving method is shown in the FIGURE. The fast model generating and solving method includes following steps.

Step 1), information of all branches and nodes which are involved during operation simulation time period is obtained, and original-node impedance matrices, load shifting distribution factor original matrices and generator shifting distribution factor original matrices of all involved branches are calculated according to connections between the branches and the nodes and the reactance of each branch.

The step 1) includes following steps:

Step 1.1), generating branch admittance matrix according to the reactance of each branch, as the following expression (1):

$$y = \begin{bmatrix} \frac{1}{x_1} & & & & \\ & \ddots & & & \\ & & \frac{1}{x_l} & & \\ & & & \ddots & \\ & & & & \frac{1}{x_K} \end{bmatrix}; \quad (1)$$

where y is the branch admittance matrix, $x_l$ is reactance of branch l, and l=1, 2, . . . , K, and K is number of the branches:

Step 1.2), generating node-branch incidence matrix and generator-node incidence matrix according to the connections between the branches and the nodes; firstly, generating branch-node incidence matrix $H_l$ for each branch, as the following expression (2), where $H_l$ has N elements. For the l-th branch, the element in $H_l$ corresponding to beginning node i is set to 1 and the element in $H_l$ corresponding to end node j is set to −1:

$$H_l = [\underset{1}{0}, \ldots, \underset{i}{1}, \ldots, \underset{j}{-1}, \ldots, \underset{N}{0}]^T; \quad (2)$$

T is superscript denoting transposition of vector or matrix.

generating the node-branch incidence matrix using the branch-node incidence matrix, as the following expression (3):

$$A=[H_1 H_2 \ldots H_K] \quad (3):$$

setting the node connected to the generator unit with maximum capacity as a relaxation node, deleting the row corresponding to the relaxation node to obtain reduced-order node-branch incidence matrix Ã:

establishing generator-node incidence matrix $R_m$ for each generator, as the following expression (4), where $R_m$ has N elements, for the m-th generator unit, m=1, 2, . . . , M, and, assuming that the m-th generator unit is connected to node i, and the i-th element in $R_m$ is set to 1:

$$R_m = [\underset{1}{0}, \ldots, \underset{i}{1}, \ldots, \underset{N}{0}]^T; \quad (4)$$

generating the generator-node incidence matrix using the generator-node incidence matrix, as the following expression (5):

$$A_G=[R_1 R_2 \ldots R_M] \quad (5):$$

deleting the row corresponding to the relaxation node to obtain reduced-order generator-node incidence matrix $Ã_G$;

Step 1.3), obtaining the generator shifting distribution factor original matrix and the load shifting distribution factor original matrix according to the branch admittance matrix, the node-branch incidence matrix and the reduced-order generator-node incidence matrix; calculating the original-node impedance matrix X, load shifting distribution factor original reduced-order matrix $\tilde{G}_D$ and generator shifting distribution factor original reduced-order matrix $\tilde{G}_G$, as the following expressions (6), (7), and (8):

$$X=(\tilde{A} y \tilde{A}^T)^{-1} \quad (6):$$

$$G_D = y \tilde{A}^T X \quad (7);$$

$$\tilde{G}_G = \tilde{G}_D \tilde{A}_G; \quad (8):$$

for the relaxation node $\hat{i}$, inserting vector whose elements are all equal to zero into columns corresponding to $\tilde{G}_G$ and $\tilde{G}_D$, respectively to obtain the load shifting distribution factor original matrix $G_D$ and the generator shifting distribution factor original matrix $G_G$.

Step 2), operation simulation calculation is started day-by-day to obtain on-off state of branches in a current simulation day, and the load shifting distribution factor original matrix and the generator shifting distribution factor original matrix are corrected according to the on-off state of branches to obtain load shifting distribution factor matrix and generator shifting distribution factor matrix in the current simulation day after considering the on-off state of branches.

The step 2) includes following steps:

Step 2.1), defining $\Omega:\{b_1, b_2 \ldots b_B\}$ as set of disconnected branches in the current simulation day, and $b_1$ as a current disconnected branch in the power system, and $x_{b_1}$ as impedance of $b_1$, and i as a beginning node of $b_1$, and j as an end node of $b_1$;

Step 2.2), calculating an intermediate variable $x_{b_1}'$ of $b_1$, as the following expression (9):

$$x_{b_1}' = -x_{b_1} + X_{ii} + X_{jj} - X_{ij} - X_{ji} \quad (9);$$

where, in the above expression, $X_{ii}$, $X_{jj}$, $X_{ij}$, and $X_{ji}$ are elements corresponding to the original-node impedance matrix X:

Step 2.3), calculating a correction matrix X' of node impedance matrix considering the disconnected branch $b_1$, and calculating a node impedance matrix $X_{b_1}$ considering the disconnected branch $b_1$ according to the correction matrix X' and the original-node impedance matrix X, as the following expressions (10) and (11):

$$X' = \frac{1}{x_{b_1}'}
\begin{bmatrix}
(X_{1i} - X_{1j})(X_{i1} - X_{j1}) & (X_{1i} - X_{1j})(X_{i2} - X_{j2}) & \cdots & (X_{1i} - X_{1j})(X_{iN} - X_{jN}) \\
(X_{2i} - X_{2j})(X_{i1} - X_{j1}) & (X_{2i} - X_{2j})(X_{i2} - X_{j2}) & \cdots & (X_{2i} - X_{2j})(X_{iN} - X_{jN}) \\
\vdots & \vdots & \ddots & \vdots \\
(X_{Ni} - X_{Nj})(X_{i1} - X_{j1}) & (X_{Ni} - X_{Nj})(X_{i2} - X_{j2}) & \cdots & (X_{Ni} - X_{Nj})(X_{iN} - X_{jN})
\end{bmatrix}; \quad (10)$$

$$X_{b_1} = X - X'; \quad (11)$$

where, subscripts of X are row number and column number of the element of X in the original-node impedance matrix X, and $X_{i1}$ is the element at the i-th row and the first column in the original-node impedance matrix X, $X_{j1}$ is the element at the j-th row and the first column in X, $X_{i2}$ is the element at the i-th row and the second column in X, $X_{j2}$ is the element at the j-th row j and the second column in X, $X_{iN}$ is the element at the i-th row and the N-th column in X, $X_{jN}$ is the element at the i-th row and the N-th column in X, $X_{1i}$ is the element at the first row and the i-th column in X, $X_{1j}$ is the element at the first row and the j-th column in X, $X_{2i}$ is the element at the second row and the i-th column in X, $X_{2j}$ is the element at the second row and the j-th column in X, $X_{ni}$ is the element at the N-th row and the i-th column in X, $X_{Nj}$ is the element at the N-th row and the j-th column in X;

Step 2.4), calculating correction matrix $\tilde{G}_D'$ of load shifting distribution factor considering the disconnected branch $b_1$ according to the load shifting distribution factor original reduced-order matrix $\tilde{G}_D$ and the original-node impedance matrix X, and calculating load shifting distribution factor reduced-order matrix $\tilde{G}_D'$ considering the disconnected branch $b_1$ according to the correction matrix $\tilde{G}_D'$ and the load shifting distribution factor original reduced-order matrix $\tilde{G}_D$, as the following expressions (12) and (13):

$$\tilde{G}_D' = \frac{1}{x_{b_1}'}
\begin{bmatrix}
(g_{1i} - g_{1j})(X_{i1} - X_{j1}) & (g_{1i} - g_{1j})(X_{i2} - X_{j2}) & \cdots & (g_{1i} - g_{1j})(X_{iN} - X_{jN}) \\
(g_{2i} - g_{2j})(X_{i1} - X_{j1}) & (g_{2i} - g_{2j})(X_{i2} - X_{j2}) & \cdots & (g_{2i} - g_{2j})(X_{iN} - X_{jN}) \\
\vdots & \vdots & \ddots & \vdots \\
(g_{Ki} - g_{Kj})(X_{i1} - X_{j1}) & (g_{Ki} - g_{Kj})(X_{i2} - X_{j2}) & \cdots & (g_{Ki} - g_{Kj})(X_{iN} - X_{jN})
\end{bmatrix}; \quad (12)$$

$$\tilde{G}_{D,b_1}' = \tilde{G}_D - \tilde{G}_D'; \quad (13)$$

where, $g_{1i}$ is the element at the first row and the i-th column in the load shifting distribution factor original reduced-order matrix $\tilde{G}_D$, $g_{1j}$ is the element at the first row and the j-th column in $\tilde{G}_D$, $g_{2i}$ is the element at the second row and the i-th column in $\tilde{G}_D$, $g_{2j}$ is the element at the second row and the j-th column in $\tilde{G}_D$, $g_{Ki}$ is the element at the K-th row and the i-th column in $\tilde{G}_D$, $g_{Kj}$ is the element at the K-th row and the j-th column in $\tilde{G}_D$;

Step 2.5), calculating generator shifting distribution factor reduced-order matrix $\tilde{G}_{G,b_1}'$ considering the disconnected branch $b_i$ according to the load shifting distribution factor reduced-order matrix $\tilde{G}_{D,b_1}'$, as the following expression (14):

$$\tilde{G}_{G,b_1}' = \tilde{G}_G - \tilde{G}_{D,b_1}' \tilde{A}_G \quad (14):$$

Step 2.6), for the relaxation node $\hat{i}$, inserting vector whose elements are all equal to zero into columns of $\tilde{G}_{G,b_1}'$ and $\tilde{G}_{D,b_1}'$, respectively to obtain the load shifting distribution factor matrix $G_{D,b_1}$, and the generator shifting distribution factor matrix $G_{G,b_1}$;

Step 2.7), regarding $X_{b_1}$, $\tilde{G}_{G,b_1}'$ and $\tilde{G}_{D,b_1}'$ as new original-node impedance matrix, new load shifting distribution factor original reduced-order matrix and new generator shifting distribution factor original reduced-order matrix, and calculating the node impedance matrix, the load shifting distribution factor reduced-order matrix and the generator shifting distribution factor reduced-order matrix and continuing the steps 2.2) to 2.7) until the disconnect branches in the d-th day are processed, and obtaining the generator shifting distribution factor matrix $G_{G,b_B}$, and the load shifting distribution factor matrix $G_{D,b_B}$ for the d-th day, and generating security constraint of the unit commitment model for the d-th day, as the following expression (15):

$$\underline{F} \leq G_{G,b_B}P^T - G_{D,b_B}L^T \leq \overline{F} \quad (15):$$

where P is vector of output of different types of generator unit at each time period and is decision variable of the unit commitment optimal model, $\underline{F}$ and $\overline{F}$ are the upper and lower limits of branch power flow, respectively L is vector of the node loads.

Step 3), output of each generator unit at each time period is obtained using a mixed integer programming algorithm according to no-security-constraint unit commitment model, and for each time period, each branch power flow is calculated according to the output of each generator unit at each time period and node loads, and overload of each branch is determined according to the branch power flow and branch power flow limits; and security constraint in the unit commitment model is generated according to rows of the load shifting distribution factor matrix and the generator shifting distribution factor matrix corresponding for the overloaded branches; and the output of each generator unit at each time period is obtained using the mixed integer programming algorithm according to the no-security-constraint unit commitment model again, and then, overload of each branch is determined again; and solving iteratively until no branch is overloaded, and output of each generator unit at each time period is obtained under security constraint for completion of operation simulation for the current simulation day, and operating simulation for the rest simulation days is performed to obtain security-constraint operation simulation result for the whole year.

The step 3) includes following steps:

Step 3.1), defining security constraint set Θ of the power system as being equal to Ø, Ø is null set and defining calculation loop variable s as being equal to zero, and calculating the no-security-constraint unit commitment model $\underline{F} \leq G_G P^T - G_D L^T \leq \overline{F}$ to obtain output $X^{(0)}$ of each generator unit, calculating the branch power flow according to $X^{(0)}$ and L, as the following expression (16):

$$F^{(0)} = G_{G,b_B} P^{(0)T} - G_{D,b_B} L^T \quad (16):$$

determining overload of each branch according to $F^{(0)}$, $\underline{F}$, and $\overline{F}$, and recording set of overloaded branches as $\Theta^{(1)}$, if $\Theta^{(1)}$ is null set, going to step 3.3), and if $\Theta^{(1)}$ is not null set, updating the security constraint set $\Theta = \Theta^{(1)}$, and defining $g_{G,b_B,l}$ as the elements at l-th row in $G_{G,b_B}$ and defining $g_{D,b_B,l}$ as the elements at the l-th row in $G_{D,b_B}$, and defining $\underline{f}_l$ as the l-th elements of $\underline{F}$, and defining $\overline{f}_l$ as the l-th elements of $\overline{F}$, and calculating security-constrained unit commitment model for the d-th day, as the following expression (17):

$$\underline{f}_l \leq g_{G,b_B,l} P^{(0)T} - g_{D,b_B,l} L^T \leq \overline{f}_l, \ l \in \Theta \quad (17);$$

solving the unit commitment model considering Θ to obtain optimal solution $P^{(1)}$ of the unit commitment model considering Θ in the first iteration;

Step 3.2), s=s+1 to enter the next iteration, for the s-th iteration, calculating the branch power flow according to $P^{(s)}$ and L, as following:

$$F^{(s)} = G_{G,b_B} P^{(s)T} - G_{D,b_B} L^T;$$

determining overload of each branch according to $F^{(s)}$, $\underline{F}$, and $\overline{F}$, and recording set of overloaded branches as $\Theta^{(s)}$, if $\Theta^{(s)}$ is null set, going to the step 3.3), and if $\Theta^{(s)}$ is not null set, updating the security constraint set $\Theta = \Theta^{(s-1)} \cup \Theta^{(s)}$, and calculating security-constrained unit commitment model for the d-th day, as following:

$$\underline{f}_l \leq g_{G,b_B,l} P^{(s)T} - g_{D,b_B,l} L^T \leq \overline{f}_l, \ l \in \Theta(s);$$

solving the unit commitment model considering Θ to obtain $P^{(s+1)}$, and repeating the step 3.2);

Step 3.3), considering $P^{(s)}$ as the optimal solution of the security-constrained unit commitment model, and d=d+1 to go to the step 2.1) to calculate the operation simulation for the (d+1)-th day.

Advantages of the fast model generating and solving method for security-constrained power system operation simulation in the embodiments of the present disclosure follows:

The fast model generating and solving method for security-constrained power system operation simulation is based on the conventional power system operation simulation. The method can calculate the load shifting distribution factor matrix and the generator shifting distribution factor matrix fast in each simulation day and solve the security-constrained unit commitment model fast. Calculations of the security-constrained power system operation simulation can be applied to the large-scale real-word power system by implementing the method in the embodiments of the present disclosure. Indexes, such as adaptability, economy, environmental protection, etc. can be evaluated more scientifically in the future implementation of the power system planning. This improves quality of the power system planning. Therefore, the method in the embodiments of the present disclosure is a promising technique for power systems.

In the following, a non-transitory computer-readable storage medium according to embodiments of the present disclosure will be described in detail.

In some embodiments, the non-transitory computer-readable storage medium having stored therein instructions that, when executed by a processor of a device, causes the device to perform a fast model generating and solving method for security-constrained power system operation simulation. The fast model generating and solving method includes following steps:

1) obtaining information of all branches and nodes which are involved during operation simulation time period, calculating original-node impedance matrix, load shifting distribution factor original matrix and generator shifting distribution factor original matrix of all involved branches according to connections between the branches and the nodes and reactance of each branch:

2) starting operation simulation calculation day-by-day to obtain on-off state of branches in a current simulation day, correcting the load shifting distribution factor original matrix and the generator shifting distribution factor original matrix according to the on-off state of branches to obtain load shifting distribution factor matrix and generator shifting distribution factor matrix in the current simulation day after considering the on-off state of branches;

3) obtaining output of each generator unit at each time period using a mixed integer programming algorithm according to no-security-constraint unit commitment model, for each time period, calculating each branch power flow according to the output of each generator unit at each time period and node loads, determining overload of each branch according to the branch power flow and branch power flow limits; generating security constraint in the unit commitment model according to rows of the load shifting distribution factor matrix and the generator shifting distribution factor matrix corresponding for the overloaded branches; obtaining the output of each generator unit at each time period using the mixed integer programming algorithm according to the no-security-constraint unit commitment model again, and then, determining overload of each branch again; solving iteratively until no branch is overloaded, and obtaining output of each generator unit at each time period under security constraint for completion of operation simulation for the current simulation day, performing operating simulation for the rest simulation days to obtain security-constraint operation simulation result for the whole year.

Any process or method described in the flowing diagram or other means may be understood as a module, segment or portion including one or more executable instruction codes of the procedures configured to achieve a certain logic function or process, and the preferred embodiments of the present disclosure include other performances, in which the performance may be achieved in other orders instead of the order shown or discussed, such as in an almost simultaneous way or in an opposite order, which should be appreciated by those having ordinary skills in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It should be understood that, each part of the present disclosure may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The non-transitory computer-readable storage medium may be, but is not limited to, read-only memories, magnetic disks, or optical disks.

Reference throughout this specification to "an embodiment," "some embodiments." "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for a security-constrained power system operation simulation of a security-constrained power system comprising a plurality of generator units, branches, and nodes, the method comprising the following steps:
   1) receiving information from the branches and the nodes during an operation simulation time period, storing the information on a non-transitory computer-readable storage medium, and calculating, with one or more processors, an original-node impedance matrix, load shifting distribution factor original matrix, and generator shifting distribution factor original matrix of the branches according to connections between the branches and the nodes and the reactance of each branch;
   2) starting, with the one or more processors, a day-by-day operation simulation calculation by: obtaining on-off state of branches in a current simulation day; correcting the load shifting distribution factor original matrix and the generator shifting distribution factor original matrix according to the on-off state of branches to obtain load shifting distribution factor matrix and generator shifting distribution factor matrix in the current simulation day after considering the on-off state of branches;

3) obtaining, with the one or more processors, an output of each generator unit at each time period by using a mixed integer programming algorithm according to no-security-constraint unit commitment model; calculating, with the one or more processors, each branch power flow for each time period according to the output of each generator unit at each time period and node loads; determining, with the one or more processors, an overload of each branch according to the branch power flow and branch power flow limits; generating, with the one or more processors, a security constraint in the unit commitment model according to rows of the load shifting distribution factor matrix and the generator shifting distribution factor matrix corresponding to the overloaded branches; obtaining, with the one or more processors, the output of each generator unit at each time period by using the mixed integer programming algorithm according to the no-security-constraint unit commitment model again; determining, with the one or more processors, the overload of each branch again; solving, with the one or more processors, the output of each generator unit at each time period iteratively until no branch is overloaded; obtaining, with the one or more processors, the output of each generator unit at each time period under security constraint for completion of operation simulation for the current simulation day; performing, with the one or more processors, an operating simulation for the remaining simulation days to obtain security-constraint operation simulation results for a whole year.

2. The method of claim 1, wherein the step 1) comprises the following steps:

1.1) generating, with the one or more processors, a branch admittance matrix according to the reactance of each branch, as following:

$$y = \begin{bmatrix} \frac{1}{x_1} & & & & \\ & \ddots & & & \\ & & \frac{1}{x_l} & & \\ & & & \ddots & \\ & & & & \frac{1}{x_K} \end{bmatrix};$$

where, y is the branch admittance matrix, $x_l$ is reactance of branch l, and l=1, 2, ..., K, and K is the number of the branches;

1.2) generating, with the one or more processors, a node-branch incidence matrix and generator-node incidence matrix according to the connections between the branches and the nodes;

firstly, generating, with the one or more processors, branch-node incidence matrix $H_l$ for each branch, as following, where $H_l$ has N elements and N is the number of the nodes, for the l-th branch, the element in $H_l$ corresponding to beginning node i is set to 1 and the element in $H_l$ corresponding to end node j is set to −1:

$$H_l = [0, \ldots, \underset{i}{1}, \ldots, \underset{j}{-1}, \ldots, \underset{N}{0}]^T;$$

T is superscript denoting transposition of vector or matrix; generating the node-branch incidence matrix by using the branch-node incidence matrix, as following:

$$A=[H_1 H_2 \ldots H_K];$$

setting, with the one or more processors, the node connected to the generator unit with maximum capacity as a relaxation node, and deleting the row of the node-branch incidence matrix A corresponding to the relaxation node to obtain reduced-order node-branch incidence matrix $\tilde{A}$;

establishing, with the one or more processors, a generator-node incidence matrix $R_m$ for each generator, as following, where $R_m$ has N elements, for the m-th generator unit, m=1, 2 ..., M, and M is the number of the generator units; assuming that the m-th generator unit is connected to node i, and the i-th element in Rm is set to 1:

$$R_m = [0, \ldots, \underset{i}{1}, \ldots, \underset{N}{0}]^T;$$

generating, with the one or more processors, the generator-node incidence matrix Ia using the generator-node incidence matrix, as following:

$$A_G=[R_1 R_2 \ldots R_M];$$

deleting, with the one or more processors, the row of the generator-node incidence matrix $A_G$ corresponding to the relaxation node to obtain a reduced-order generator-node incidence matrix $\tilde{A}_G$;

1.3) obtaining, with the one or more processors, the generator shifting distribution factor original matrix and the load shifting distribution factor original matrix according to the branch admittance matrix, the node-branch incidence matrix, and the reduced-order generator-node incidence matrix; calculating, with the one or more processors, the original-node impedance matrix X, load shifting distribution factor original reduced-order $\tilde{G}_D$, matrix and generator shifting distribution factor original reduced-order matrix $\tilde{G}_G$, as following:

$$X=(\tilde{A}y\tilde{A}^T)^{-1},$$

$$\tilde{G}_D=y\tilde{A}^T X,$$

$$\tilde{G}_G=\tilde{G}_D \tilde{A}_G;$$

for the relaxation node $\hat{i}$, inserting a vector whose elements are all equal to zero into columns corresponding to $\tilde{G}_G$ and $\tilde{G}_D$, respectively to obtain, with the one or more processors, the load shifting distribution factor original matrix $G_D$ and the generator shifting distribution factor original matrix $G_G$.

3. The method of claim 2, wherein the step 2) comprises the following steps:

defining $\Omega$: $\{b_1, b_2, \ldots, b_B\}$ as a set of disconnected branches in the current simulation day, and $b_1$ as a current disconnected branch in the power system, and $x_{b_1}$ as impedance of $b_1$, and i as a beginning node of $b_1$, and j as an end node of $b_1$;

2.2) calculating, with the one or more processors, an intermediate variable $x_{b_1}'$ of $b_1$, as following:

$$x_{b_1}'=-x_{b1}+X_{ii}+X_{jj}-X_{ij}-X_{ji};$$

where, in the above expression, $X_{ii}$, $X_{jj}$, $X_{ij}$, and $X_{ji}$ are elements corresponding to the original-node impedance matrix X;

2.3) calculating, with the one or more processors, a correction matrix X' of node impedance matrix considering the disconnected branch $b_1$, and calculating a node impedance matrix $X_{b_1}$ considering the disconnected branch $b_1$ according to the correction matrix X' and the original-node impedance matrix X, as following:

$$X' = \frac{1}{x'_{b_1}} \begin{bmatrix} (X_{1i} - X_{1j})(X_{i1} - X_{j1}) & (X_{1i} - X_{1j})(X_{i2} - X_{j2}) & \cdots & (X_{1i} - X_{1j})(X_{iN} - X_{jN}) \\ (X_{2i} - X_{2j})(X_{i1} - X_{j1}) & (X_{2i} - X_{2j})(X_{i2} - X_{j2}) & \cdots & (X_{2i} - X_{2j})(X_{iN} - X_{jN}) \\ \vdots & \vdots & \ddots & \vdots \\ (X_{Ni} - X_{Nj})(X_{i1} - X_{j1}) & (X_{Ni} - X_{Nj})(X_{i2} - X_{j2}) & \cdots & (X_{Ni} - X_{Nj})(X_{iN} - X_{jN}) \end{bmatrix},$$

$$X_{b_1} = X - X';$$

where, subscripts of X are row number and column number of the element of X in the original-node impedance matrix X, and $X_{i1}$ is the element at the i-th row and the first column in the original-node impedance matrix X, $X_{j1}$ is the element at the j-th row and the first column in X, $X_{i2}$ is the element at the i-th row and the second column in X, $X_{j2}$ is the element at the j-th row and the second column in X, $X_{iN}$ is the element at the i-th row and the N-th column in X, $X_{jN}$ is the element at the j-th row and the N-th column in X, $X_{1i}$ is the element at the first row and the i-th column in X, $X_{1j}$ is the element at the first row and the j-th column in X, $X_{2i}$ is the element at the second row and the i-th column in X, $X_{2j}$ is the element at the second row and the j-th column in X, $X_{Ni}$ is the element at the N-th row and the i-th column in X, and $X_{Nj}$ is the element at the N-th row and the j-th column in X;

2.4) calculating, with the one or more processors, a correction matrix $\tilde{G}_D'$ of load shifting distribution factor considering the disconnected branch $b_1$ according to the load shifting distribution factor original reduced-order matrix $\tilde{G}_D$ and the original-node impedance matrix X, and calculating, with the one or more processors, a load shifting distribution factor reduced-order matrix $\tilde{G}_{D,b_1}'$ considering the disconnected branch $b_1$ according to the correction matrix $\tilde{G}_D'$ and the load shifting distribution factor original reduced-order matrix $\tilde{G}_D$, as following:

$$\tilde{G}_D' = \frac{1}{x'_{b_1}} \begin{bmatrix} (g_{1i} - g_{1j})(X_{i1} - X_{j1}) & (g_{1i} - g_{1j})(X_{i2} - X_{j2}) & \cdots & (g_{1i} - g_{1j})(X_{iN} - X_{jN}) \\ (g_{2i} - g_{2j})(X_{i1} - X_{j1}) & (g_{2i} - g_{2j})(X_{i2} - X_{j2}) & \cdots & (g_{2i} - g_{2j})(X_{iN} - X_{jN}) \\ \vdots & \vdots & \ddots & \vdots \\ (g_{Ki} - g_{Kj})(X_{i1} - X_{j1}) & (g_{Ki} - g_{Kj})(X_{i2} - X_{j2}) & \cdots & (g_{Ki} - g_{Kj})(X_{iN} - X_{jN}) \end{bmatrix};$$

$$\tilde{G}_{D,b_1}' = \tilde{G}_D - \tilde{G}_D';$$

where, $g_{1i}$ is the element at the first row and the i-th column in the load shifting distribution factor original reduced-order matrix $\tilde{G}_D$, $g_{1j}$ is the element at the first row and the j-th column in $\tilde{G}_D$, $g_{2i}$ is the element at the second row and the i-th column in $\tilde{G}_D$, $g_{2j}$ is the element at the second row and the j-th column in $\tilde{G}_D$, $g_{Ki}$ is the element at the K-th row and the i-th column in $\tilde{G}_D$, and $g_{Kj}$ is the element at the K-th row and the j-th column in $\tilde{G}_D$;

2.5) calculating, with the one or more processors, a generator shifting distribution factor reduced-order matrix $\tilde{G}_{G,b_1}'$ considering the disconnected branch $b_1$ according to the load shifting distribution factor reduced-order matrix $\tilde{G}_{D,b_1}'$, as following:

$$\tilde{G}_{G,b_1}' = \tilde{G}_G - \tilde{G}_{D,b_1}' \tilde{A}_G;$$

2.6) for the relaxation node $\hat{i}$, inserting a vector whose elements are all equal to zero into columns of $\tilde{G}_{G,b_1}'$ and $\tilde{G}_{D,b_1}'$, respectively to obtain, with the one or more processors, the load shifting distribution factor matrix $G_{D,b_1}$ and the generator shifting distribution factor matrix $G_{G,b_1}$;

2.7) regarding $X_{b_1}$, $\tilde{G}_{G,b_1}$, and $\tilde{G}_{D,b_1}'$ as a new original-node impedance matrix, a new load shifting distribution factor original reduced-order matrix, and a new generator shifting distribution factor original reduced-order matrix, and calculating, with the one or more processors, the node impedance matrix, the load shifting distribution factor reduced-order matrix, and the generator shifting distribution factor reduced-order matrix and continuing the steps 2.2) to 2.7) until the disconnect branches in the d-th day are processed, and obtaining, with the one or more processors, the generator shifting distribution factor matrix $G_{G,b_B}$ and the load shifting distribution factor matrix $G_{D,b_B}$ for the d-th day, and generating, with the one or more processors, security constraint of the unit commitment model for the d-th day, as following:

$$\underline{F} \leq G_{G,b_B} P^T - G_{D,b_B} L^T \leq \overline{F};$$

where P is vector of output of different types of generator units at each time period and is decision variable of the unit commitment optimal model, $\underline{F}$ and $\overline{F}$ are the upper and lower limits of branch power flow, respectively, and L is vector of the node loads.

4. The method of claim 3, wherein the step 3) comprises the following steps:

3.1) defining a security constraint set Θ of the power system as being equal to ∅, ∅ is null set, and defining a calculation loop variable s as being equal to zero, and calculating, with the one or more processors, the no-security-constraint unit commitment model $\underline{F} \leq G_G P^T - G_D L^T \leq \overline{F}$ to obtain output $X^{(0)}$ of each generator unit, and calculating, with the one or more processors, the branch power flow according to $X^{(0)}$ and L, as following:

$$F^{(0)} = G_{G,b_B} P^{(0)T} - G_{D,b_B} L^T;$$

determining, with the one or more processors, an overload of each branch according to $F^{(0)}$, $\underline{F}$ and $\overline{F}$, and recording set of overloaded branches as $\Theta^{(1)}$; if $\Theta^{(1)}$ is null set, going to step 3.3), and if $\Theta^{(1)}$ is not null set, updating the security constraint set $\Theta = \Theta^{(1)}$; defining $g_{G,b_B,l}$ as the elements at l-th row in $G_{G,b_B}$, and defining $g_{D,b_B,l}$ as the elements at the l-th row in $G_{D,b_B}$, and defining $\overline{f}_l$ as the l-th elements of $\underline{F}$, and defining $\overline{f}_l$ as the l-th elements of $\overline{F}$, and calculating, with the one or more processors, a security-constrained unit commitment model for the d-th day, as following:

$$\underline{f}_l \leq g_{G,b_B,l} P^{(0)T} - g_{D,b_B,l} L^T \leq \overline{f}_l;$$

solving, with the one or more processors, the unit commitment model considering Θ to obtain optimal solution $P^{(1)}$ of the unit commitment model considering Θ in the first iteration;

3.2) defining s=s+1 to enter the next iteration; for the s-th iteration, calculating the branch power flow according to $P^{(s)}$ and L, as following:

$$F^{(s)} = G_{G,b_B} P^{(s)T} - G_{D,b_B} L^T;$$

determining, with the one or more processors, the overload of each branch according to $F^{(s)}$, $\underline{F}$, and $\overline{F}$, and recording the set of overloaded branches as $\Theta^{(s)}$; if $\Theta^{(s)}$ is null set, going to the step 3.3), and if $\Theta^{(s)}$ is not null set, updating the security constraint set $\Theta = \Theta^{(s-1)}$, and calculating the security-constrained unit commitment model for the d-th day, with the one or more processors, as following:

$$\underline{f}_l \leq g_{G,b_B,l} P^{(s)T} - g_{D,b_B,l} L^T \leq \overline{f}_l, l \in \Theta^{(s)};$$

solving, with the one or more processors, the unit commitment model considering Θ to obtain $P^{(s+1)}$, and repeating the step 3.2);

3.3) considering $P^{(s)}$ as the optimal solution of the security-constrained unit commitment model, and defining d=d+1 to go to the step 2.1) to calculate, with the one or more processors, the operation simulation for the (d+1)-th day.

5. The method of claim 1, wherein the branch is defined by transmission lines, cables, transformers, and power transmission equipment connected to two buses, and the node is defined by one bus in the security-constrained power system.

6. A non-transitory computer-readable storage medium, having stored therein instructions that, when executed by a processor of a device, causes the device to perform a fast model generating and solving method for a security-constrained power system operation simulation; the security-constrained power system comprising a plurality of generator units, branches, and nodes; wherein the fast model generating and solving method comprises the following steps:

1) obtaining information of all branches and nodes which are involved during an operation simulation time period, calculating an original-node impedance matrix, load shifting distribution factor original matrix, and generator shifting distribution factor original matrix of all involved branches according to connections between the branches and the nodes and reactance of each branch;

2) starting a day-by-day operation simulation calculation by: obtaining an on-off state of branches in a current simulation day, correcting the load shifting distribution factor original matrix and the generator shifting distribution factor original matrix according to the on-off state of branches to obtain load shifting distribution factor matrix and generator shifting distribution factor matrix in the current simulation day after considering the on-off state of branches;

3) obtaining an output of each generator unit at each time period by using a mixed integer programming algorithm according to no-security-constraint unit commitment model; for each time period, calculating each branch power flow according to the output of each generator unit at each time period and node loads; determining an overload of each branch according to the branch power flow and branch power flow limits; generating a security constraint in the unit commitment model according to rows of the load shifting distribution factor matrix and the generator shifting distribution factor matrix corresponding to the overloaded branches; obtaining the output of each generator unit at each time period by using the mixed integer programming algorithm according to the no-security-constraint unit commitment model again; and then, determining the overload of each branch again; solving the output of each generator unit at each time period iteratively until no branch is overloaded, and obtaining the output of each generator unit at each time period under security constraint for completion of operation simulation for the current simulation day; performing operating simulation for remaining simulation days to obtain security-constraint operation simulation results for a whole year.

7. The non-transitory computer-readable storage medium of claim 6, wherein the step 1) comprises the following steps:

1.1) generating branch admittance matrix y according to the reactance of each branch;

1.2) generating node-branch incidence matrix and generator-node incidence matrix according to the connections between the branches and the nodes;

wherein the step 1.2) comprises the following step:

generating branch-node incidence matrix $H_l$ for each branch;

generating the node-branch incidence matrix A by using the branch-node incidence matrix $H_l$;

setting the node connected to the generator unit with maximum capacity as a relaxation node î and obtaining reduced-order node-branch incidence matrix Ã according to the relaxation node î and the node-branch incidence matrix A;

establishing generator-node incidence matrix $R_m$ for each generator and generating the generator-node incidence matrix $A_G$ by using the generator-node incidence matrix $R_m$;

obtaining reduced-order generator-node incidence matrix $\tilde{A}_G$ according to the generator-node incidence matrix $A_G$ and the relaxation node $\hat{i}$;

1.3) obtaining the generator shifting distribution factor original matrix $G_G$ and the load shifting distribution factor original matrix $G_D$ according to the branch admittance matrix y and the node-branch incidence matrix A;

wherein the step 1.3) comprises the following steps:

calculating the original-node impedance matrix X, load shifting distribution factor original reduced-order matrix $\tilde{G}_D$, and generator shifting distribution factor original reduced-order matrix $\tilde{G}_G$;

obtaining the load shifting distribution factor original matrix $G_D$ according to the load shifting distribution factor original reduced-order matrix $\tilde{G}_D$ and the relaxation node $\hat{i}$ and obtaining the generator shifting distribution factor original matrix $G_G$ according to the generator shifting distribution factor original reduced-order matrix $\tilde{G}_G$ and the relaxation node $\hat{i}$.

8. The non-transitory computer-readable storage medium of claim 6, wherein the step 2) comprises the following steps:

2.1) defining $\Omega:\{b_1, b_2, \ldots b_B\}$ as a set of disconnected branches in the current simulation day, and $b_1$ as a current disconnected branch in the power system, and $x_{b_1}$ as impedance of $b_1$, and i as a beginning node of $b_1$, and j as an end node of $b_1$;

2.2) calculating an intermediate variable $x_{b_1}'$ of $b_1$;

2.3) calculating a correction matrix X' of node impedance matrix considering the disconnected branch $b_1$, and calculating a node impedance matrix $X_{b_1}$ considering the disconnected branch $b_1$ according to the correction matrix X' and the original-node impedance matrix X;

2.4) calculating correction matrix $\tilde{G}_D'$ of load shifting distribution factor considering the disconnected branch $b_1$ according to the load shifting distribution factor original reduced-order matrix $\tilde{G}_D$ and the original-node impedance matrix X, and calculating load shifting distribution factor reduced-order matrix $\tilde{G}_{D,b_1}'$ considering the disconnected branch $b_1$ according to the correction matrix $\tilde{G}_D'$ and the load shifting distribution factor original reduced-order matrix $\tilde{G}_D$;

2.5) calculating generator shifting distribution factor reduced-order matrix $\tilde{G}_{G,b_1}'$ considering the disconnected branch $b_1$ according to the load shifting distribution factor reduced-order matrix $\tilde{G}_{D,b_1}'$;

2.6) obtaining the load shifting distribution factor matrix $G_{D,b_1}$ according to the load shifting distribution factor reduced-order matrix $\tilde{G}_{D,b_1}'$ and the relaxation node $\hat{i}$, and obtaining the generator shifting distribution factor matrix $G_{G,b_1}$ according to the generator shifting distribution factor reduced-order matrix $\tilde{G}_{G,b_1}'$ and the relaxation node $\hat{i}$;

2.7) regarding the node impedance matrix $X_{b_1}$ considering the disconnected branch $b_1$, the generator shifting distribution factor reduced-order matrix $\tilde{G}_{G,b_1}'$, and the load shifting distribution factor reduced-order matrix $\tilde{G}_{D,b_1}'$ as new original-node impedance matrix X, new load shifting distribution factor original reduced-order matrix $\tilde{G}_D$, and new generator shifting distribution factor original reduced-order matrix $\tilde{G}_G$, and calculating the node impedance matrix, the load shifting distribution factor reduced-order matrix, and the generator shifting distribution factor reduced-order matrix and continuing the steps 2.2) to 2.7) until the disconnect branches in the d-th day are processed, and obtaining the generator shifting distribution factor matrix $G_{G,b_B}$ and the load shifting distribution factor matrix $G_{D,b_B}$ for the d-th day, and generating security constraint of the unit commitment model for the d-th day.

9. The non-transitory computer-readable storage medium of claim 6, wherein the step 3) comprises the following steps:

3.1) defining security constraint set $\Theta$ of the power system as being equal to $\varnothing$, $\varnothing$ is null set, and defining calculation loop variable s as being equal to zero, and calculating the no-security-constraint unit commitment model $\underline{F} \leq G_G P^T - G_D L^T \leq \overline{F}$ to obtain output $X^{(0)}$ of each generator unit, and calculating the branch power flow $F^{(0)}$ according to output $X^{(0)}$ of each generator unit and the vector of the node loads L;

determining overload of each branch according to the branch power flow $F^{(0)}$, upper limits of the branch power $\underline{F}$, and lower limits of the branch flow $\overline{F}$; recording set of overloaded branches as $\Theta^{(1)}$; if $\Theta^{(1)}$ is null set, going to step 3.3), and if $\Theta^{(1)}$ is not null set, updating the security constraint set $\Theta = \Theta^{(1)}$;

calculating security-constrained unit commitment model for the d-th day according the load shifting distribution factor matrix $G_{D,b_B}$, the generator shifting distribution factor matrix $G_{G,b_B}$, the upper limits of the branch power $\underline{F}$, and the lower limits of the branch flow $\overline{F}$;

solving the unit commitment model considering $\Theta$ to obtain optimal solution $p^{(1)}$ of the unit commitment model considering $\Theta$ in the first iteration;

3.2) defining s=s+1 to enter the next iteration; for the s-th iteration, calculating the branch power flow $F^{(s)}$ according to optimal solution $P^{(s)}$ of the unit commitment model considering $\Theta$ in the s-th iteration and the vector of the node loads L;

determining the overload of each branch according to the branch power flow $F^{(s)}$, the upper limits of the branch power $\underline{F}$, and the lower limits of the branch flow $\overline{F}$, and recording the set of overloaded branches as $\Theta^{(s)}$; if $\Theta^{(s)}$ is null set, going to the step 3.3), and if $\Theta^{(s)}$ is not null set, updating the security constraint set $\Theta = \Theta^{(s-1)}$;

calculating the security-constrained unit commitment model for the d-th day;

solving the unit commitment model considering $\Theta$ to obtain optimal solution $P^{(s+1)}$ of the unit commitment model considering $\Theta$ in the (s+1)-th iteration, and repeating the step 3.2);

3.3) considering the optimal solution $P^{(s)}$ of the unit commitment model considering $\Theta$ in the s-th iteration as the optimal solution of the security-constrained unit commitment model, and defining d=d+1 to go to the step 2.1) to calculate the operation simulation for the (d+1)-th day.

* * * * *